(12) United States Patent
Ohmiya et al.

(10) Patent No.: US 11,223,768 B2
(45) Date of Patent: Jan. 11, 2022

(54) POSITION DETECTION DEVICE, IMAGE FORMING APPARATUS, AND POSITION DETECTION METHOD

(71) Applicants: Yutaka Ohmiya, Tokyo (JP); Daisuke Nikaku, Kanagawa (JP); Hideki Hashimoto, Tokyo (JP)

(72) Inventors: Yutaka Ohmiya, Tokyo (JP); Daisuke Nikaku, Kanagawa (JP); Hideki Hashimoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/340,121

(22) Filed: Jun. 7, 2021

(65) Prior Publication Data

US 2021/0385384 A1 Dec. 9, 2021

(30) Foreign Application Priority Data

Jun. 8, 2020 (JP) .............................. JP2020-099519

(51) Int. Cl.
*H04N 5/232* (2006.01)
*H04N 5/357* (2011.01)

(52) U.S. Cl.
CPC ..... *H04N 5/23287* (2013.01); *H04N 5/23274* (2013.01); *H04N 5/3575* (2013.01)

(58) Field of Classification Search
CPC ........... H04N 5/23287; H04N 5/23274; H04N 5/3575; H04N 5/367; H04N 5/37455;
(Continued)

(56) References Cited

U.S. PATENT DOCUMENTS 5,764,380 A 6/1998 Noguchi
6,153,879 A * 11/2000 Yoshinaga ........... G03G 21/046
250/271

(Continued)

FOREIGN PATENT DOCUMENTS

EP 3 517 887 A1 7/2019
JP 2008-078948 4/2008
(Continued)

OTHER PUBLICATIONS

U.S. Appl. No. 16/952,103, filed Nov. 19, 2020, Tatsuya Ozaki, et al.
(Continued)

*Primary Examiner* — Pritham D Prabhakher
(74) *Attorney, Agent, or Firm* — Xsensus LLP

(57) ABSTRACT

A position detection device includes a background member, a reader, and processing circuitry. The background member has a higher absorption characteristic in an invisible wavelength region than in a visible wavelength region. The reader opposite the background member irradiates a recording medium having a mark and the background member with light of a visible wavelength to output a visible image or with light of an invisible wavelength to output an invisible image. The processing circuitry is configured to: detect an end position of the recording medium and a position of the mark on the recording medium from a read image output from the reader; and select the visible or invisible image as the read image used for position detection, according to an absorption characteristic of a color material forming the mark read by the reader and an absorption characteristic of the recording medium in the invisible wavelength region.

10 Claims, 11 Drawing Sheets

(58) Field of Classification Search
CPC .... H04N 5/378; H04N 1/6027; H04N 1/6044; H04N 1/6094; H04N 1/6025; H04N 1/00819; H04N 1/40056; H04N 1/1937; H04N 1/54; H04N 1/605; H04N 1/6055; H04N 1/00037; H04N 1/00013; H04N 1/00087; H04N 1/6097; H04N 1/00824; H04N 1/04; H04N 1/00766; G03G 15/6567; G06T 7/13; G06T 7/337
USPC ........................................................ 348/222.1
See application file for complete search history.

(56) References Cited

U.S. PATENT DOCUMENTS

| | | | |
|---|---|---|---|
| 7,094,508 B2 * | 8/2006 | Takagi | G03G 9/0902 430/120.2 |
| 8,120,819 B2 * | 2/2012 | Hirokawa | H04N 1/46 358/3.28 |
| 10,616,429 B2 * | 4/2020 | Ikemoto | H04N 1/00702 |
| 10,771,646 B2 * | 9/2020 | Ishii | H04N 1/00774 |
| 10,834,272 B2 * | 11/2020 | Nakazawa | H04N 1/40056 |
| 10,924,621 B2 * | 2/2021 | Nakazawa | H04N 1/00846 |
| 2004/0058816 A1 * | 3/2004 | Narita | B41M 3/148 503/201 |
| 2005/0147912 A1 * | 7/2005 | Takagi | G03G 9/0902 430/123.5 |
| 2006/0072171 A1 | 4/2006 | Nystrom et al. | |
| 2009/0237756 A1 * | 9/2009 | Hirokawa | H04N 1/46 358/518 |
| 2011/0026085 A1 | 2/2011 | Tsukahara et al. | |
| 2011/0051201 A1 | 3/2011 | Hashimoto et al. | |
| 2011/0261425 A1 * | 10/2011 | Yamaguchi | H04N 1/1017 358/512 |
| 2013/0038672 A1 | 2/2013 | Ohmiya | |
| 2013/0044338 A1 | 2/2013 | Nikaku | |
| 2014/0072315 A1 | 3/2014 | Ohmiya et al. | |
| 2014/0072316 A1 | 3/2014 | Shinohara et al. | |
| 2014/0072351 A1 | 3/2014 | Nishina et al. | |
| 2014/0078532 A1 | 3/2014 | Nikaku | |
| 2014/0204432 A1 | 7/2014 | Hashimoto et al. | |
| 2016/0003673 A1 | 1/2016 | Hashimoto et al. | |
| 2016/0173719 A1 | 6/2016 | Hashimoto et al. | |
| 2016/0219163 A1 | 7/2016 | Shirado et al. | |
| 2016/0373604 A1 | 12/2016 | Hashimoto et al. | |
| 2017/0201700 A1 | 7/2017 | Hashimoto et al. | |
| 2017/0244853 A1 | 8/2017 | Yabuuchi et al. | |
| 2017/0302821 A1 | 10/2017 | Sasa et al. | |
| 2018/0139345 A1 | 5/2018 | Goh et al. | |
| 2019/0163112 A1 | 5/2019 | Nikaku et al. | |
| 2019/0171137 A1 | 6/2019 | Kobayashi | |
| 2019/0238687 A1 | 8/2019 | Nikaku et al. | |
| 2019/0238702 A1 | 8/2019 | Ikemoto et al. | |
| 2019/0238717 A1 | 8/2019 | Inage et al. | |
| 2019/0289163 A1 | 9/2019 | Hashimoto et al. | |
| 2019/0327387 A1 | 10/2019 | Hashimoto et al. | |
| 2019/0335061 A1 | 10/2019 | Nakazawa et al. | |
| 2019/0387131 A1 | 12/2019 | Komatsu et al. | |
| 2020/0053233 A1 * | 2/2020 | Nakazawa | H04N 1/00241 |
| 2020/0410271 A1 | 12/2020 | Nakazawa et al. | |
| 2020/0412904 A1 | 12/2020 | Ohmiya et al. | |
| 2021/0014441 A1 | 1/2021 | Ohmiya et al. | |

FOREIGN PATENT DOCUMENTS

| | | |
|---|---|---|
| JP | 2015-3480 A | 1/2015 |
| JP | 2016-180857 | 10/2016 |
| JP | 2019-102939 | 6/2019 |

OTHER PUBLICATIONS

U.S. Appl. No. 17/141,240, filed Jan. 5, 2021, Daisuke Nikaku, et al.
Extended European Search Report dated Oct. 5, 2021, in corresponding European Patent Application No. 21178196.8.

* cited by examiner

POSITION DETECTION DEVICE, IMAGE FORMING APPARATUS, AND POSITION DETECTION METHOD

CROSS-REFERENCE TO RELATED APPLICATION

This patent application is based on and claims priority pursuant to 35 U.S.C. § 119(a) to Japanese Patent Application No. 2020-099519, filed on Jun. 8, 2020 in the Japan Patent Office, the entire disclosure of which is hereby incorporated by reference herein.

BACKGROUND

Technical Field

Embodiments of the present disclosure relates to a position detection device, an image forming apparatus, and a position detection method.

Related Art

For the purpose of correcting a conveyance position of a conveyed object and a processing position on the conveyed object, there is known a technology of reading an outer edge position of the conveyed object and the processing position on the conveyed object.

However, in such reading of the outer edge position of the conveyed object and the processing position on the conveyed object, the outer edge position and the processing position of the conveyed object may not be accurately read when the density difference between the conveyed object and a background portion facing a reading device is small or when the density difference between the conveyed object and a reference mark indicating the processing position is small.

Then, Japanese Unexamined Patent Application Publication No. 2016-180857 discloses the following technology for the purpose to accurately read a references mark. The technology analyzes an image read by an image reader to specify a base color of a sheet and colors of a plurality of reference marks of different colors. After a color exhibiting the highest contrast with the base color of the sheet is selected from the colors of the plurality of reference marks, the image forming range of a print processing unit is adjusted based on positional information that is obtained from a read image obtained by reading the reference mark of the selected color with the image reader. The background portion is switched to a color of a relatively high contrast with the base color when a sheet is read.

However, according to the related art, an operation time for switching the color of the background portion and a waiting time for stabilization after switching the color of the background portion are needed, which causes a problem that productivity is reduced. Further, according to the related art, a configuration for switching the color of the background portion is needed, which causes a problem that the apparatus is more complicated.

SUMMARY

The present disclosure has been made in view of the above, and an object of the present disclosure is to detect, with high accuracy, end positions and an image formation position in various recording media with a simple configuration without reducing productivity.

In an aspect of the present disclosure, there is provided a position detection device includes a background member, a reader, and processing circuitry. The background member has a higher absorption characteristic in an invisible wavelength region than in a visible wavelength region. The reader is disposed opposite the background member and configured to irradiate a recording medium having a mark and the background member with light of a visible wavelength to output a visible image or with light of an invisible wavelength to output an invisible image. The processing circuitry is configured to: detect an end position of the recording medium and a position of the mark on the recording medium from a read image output from the reader; and select the visible image or the invisible image as the read image used for position detection, according to an absorption characteristic of a color material forming the mark read by the reader and an absorption characteristic of the recording medium in the invisible wavelength region.

In another aspect of the present disclosure, there is provided an image forming apparatus that includes the position detection device and an image forming device. The processing circuitry of the position detection device is configured to correct an image formation position on the recording medium, based on a detection result of the position detection. The image forming device is configured to form an image on the image formation position having been corrected by the processing circuitry.

In still another aspect of the present disclosure, there is provided a position detection method to be executed in a position detection device including a reader disposed opposite a background member having an absorption characteristic in a visible wavelength region than in an invisible wavelength region and configured to irradiate the background member and a recording medium having a mark, at least a part of which is formed with a color material having an absorption characteristic in the invisible wavelength region than in the visible wavelength region, with light of a visible wavelength to output a visible image or with light of an invisible wavelength to output an invisible image. The method includes: detecting an end position of the recording medium and a position of the mark on the recording medium, from a read image output from the reader; and selecting the visible image or the invisible image as the read image used in the detecting, according to an absorption characteristic of a color material forming the mark read by the reader in the invisible wavelength region and an absorption characteristic of the recording medium in the invisible wavelength region.

In still yet another aspect of the present disclosure, there is provided a non-transitory storage medium storing computer readable code for controlling a position detection device that includes a reader disposed opposite a background member having an absorption characteristic in a visible wavelength region than in an invisible wavelength region and configured to irradiate the background member and a recording medium having a mark, at least a part of which is formed with a color material having an absorption characteristic in the invisible wavelength region than in the visible wavelength region, with light of a visible wavelength to output a visible image or with light of an invisible wavelength to output an invisible image. The computer readable code controls the position detection device to execute: detecting an end position of the recording medium and a position of the mark on the recording medium, from a read image output from the reader; and selecting the visible image or the invisible image as the read image used in the detecting, according to an absorption characteristic of a color material forming the mark read by the reader in the invisible wavelength region and an absorption characteristic of the recording medium in the invisible wavelength region.

According to the present disclosure, end positions and an image formation position can be detected with high accuracy in various recording media with a simple configuration without reducing productivity.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
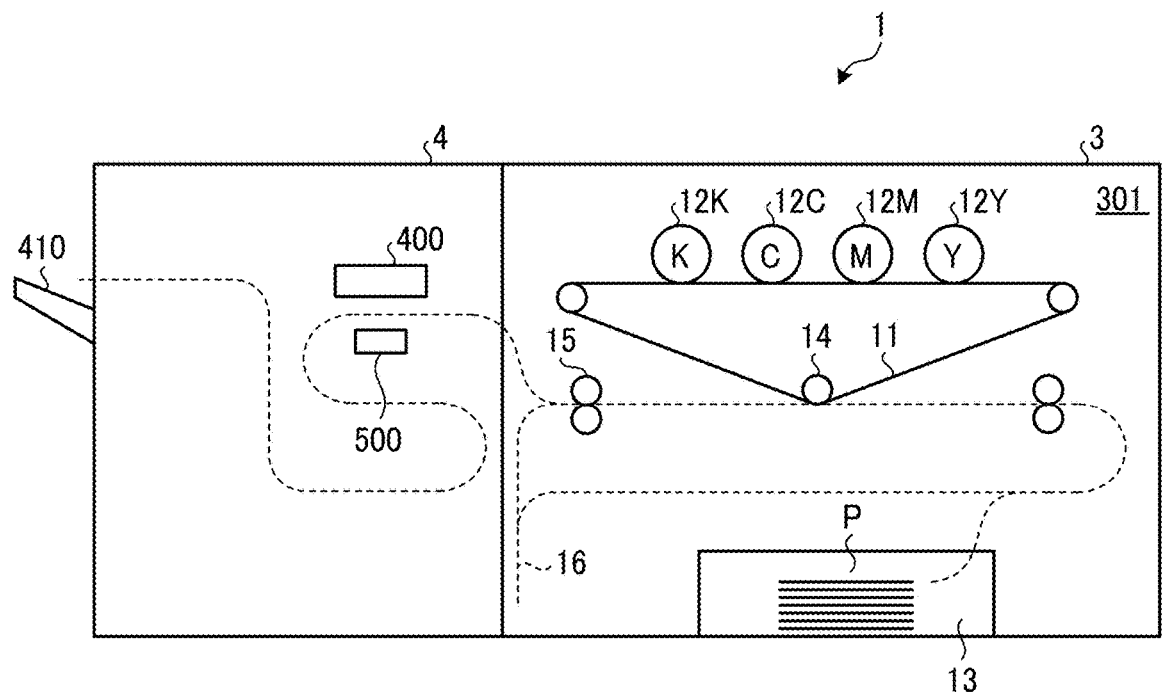
FIG. 1 is a diagram illustrating a configuration of an image forming system according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a position detection device, an image forming apparatus, and a position detection method according to embodiments of the present disclosure are described in detail with reference to accompanying drawings.

First Embodiment

FIG. 1 is a diagram illustrating a configuration of an image forming system 1 according to the first embodiment. As illustrated in FIG. 1, the image forming system 1 as an image forming apparatus includes an image forming device 3 and a position detection device 4.

The image forming device 3 includes a print processing unit 301. The print processing unit 301 acquires bitmap data input from an engine controller and executes image forming processing on a sheet P (an example of a recording medium).

The print processing unit 301 according to the present embodiment is implemented by a general image forming mechanism of an electrophotographic system, but is not limited thereto, and other image forming mechanisms such as an inkjet system may also be used.

The print processing unit 301 has a configuration in which photoconductor drums 12Y, 12M, 12C, and 12K (hereinafter, collectively referred to as photoconductor drums 12) of yellow (Y), magenta (M), cyan (C), and black (K) are disposed along a conveying belt 11 that is an endless mover, and is a so-called tandem type. In other words, the photoconductor drums 12Y, 12M, 12C, and 12K are disposed in this order from the upstream side in a conveyance direction of the conveying belt 11. The conveying belt 11 is an intermediate transfer belt on which an intermediate transfer image to be transferred onto a sheet P fed from a sheet feed tray 13 is formed.

Respective color images developed with toner on the surfaces of the photoconductor drums 12 of the respective colors are superimposed and transferred onto the conveying belt 11 to form a full-color image. The full-color image thus formed on the conveying belt 11 is transferred onto the surface of the sheet P, which has been conveyed on a conveyance path, by the function of a transfer roller 14 at a position closest to the conveyance path of the sheet P indicated by a broken line in FIG. 1.

The sheet P, on which the image has been formed, is further conveyed. After the image is fixed on the sheet P by a fixing roller 15, the sheet P is conveyed to the position detection device 4. In the case of double-sided printing, the sheet P having an image formed and fixed on one side thereof is conveyed to a reversing path 16, reversed, and conveyed again to a transfer position of the transfer roller 14.

In order to detect the positions of marks M (see FIG. 3) formed on the sheet P by the print processing unit 301 and end positions of the sheet P, the position detection device 4 is disposed downstream from the fixing roller 15 that forms an image on the sheet P.

The position detection device 4 includes a reader 400. The reader 400 is an image reader that reads a printed material, which having been printed and output by the image forming device 3, on the conveyance path and outputs a read image. The reader 400 is, for example, a line scanner installed in the conveyance path inside the position detection device 4. The reader 400 scans the surface of the sheet P conveyed between a background member 500 (see FIG. 2) and the reader 400 to read the image formed on the surface of the sheet P. The reader 400 reads the sheet P and the background member 500 serving as a background of the sheet P as subjects, and outputs a read image including a sheet region (medium region) corresponding to the sheet P and a region (background region) outside the sheet region.

Figure 2:
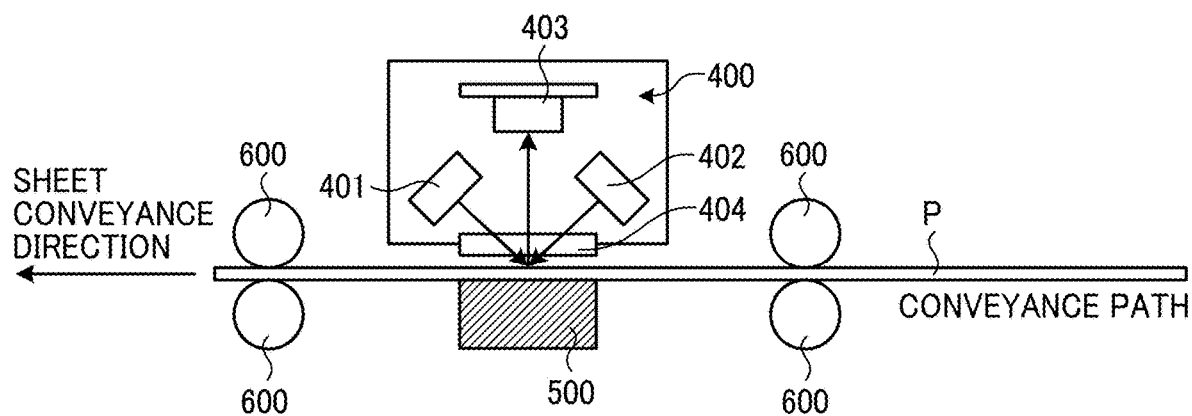
FIG. 2 is a diagram illustrating a configuration example of a reading unit and its periphery.

FIG. 2 is a diagram illustrating an example of the configuration of the reader 400 and its periphery. As illustrated in FIG. 2, the reader 400 includes two light sources 401 and 402, an imaging element 403, and an exposure glass 404.

The two light sources 401 and 402 irradiate the sheet P, which is output by the print processing unit 301 and conveyed along the conveyance path, with light via the exposure glass 404. The reader 400 is configured to read a visible image and an invisible image. The light source 401 emits visible light and the light source 402 emits invisible light. Optical components such as the exposure glass 404 and a lens have properties of transmitting not only visible light but also invisible light.

The imaging element 403 receives light reflected from the sheet P via the exposure glass 404 and converts the light into an electric signal. The imaging element 403 is an image sensor made of a silicon semiconductor and is an element capable of receiving invisible light in addition to visible light. In other words, the imaging element 403 outputs a visible image and an invisible image.

In addition, as illustrated in FIG. 2, the position detection device 4 includes the background member 500 at a position facing the reader 400 across the conveyance path formed by two roller pairs 600.

In the present embodiment, a surface of the background member 500 at a position facing the reader 400 is made of the material having low absorption characteristics in the visible wavelength region and high absorption characteristics in the invisible wavelength region, or is coated with a material having low absorption characteristics in the visible wavelength region and high absorption characteristics in the invisible wavelength region.

In the example illustrated in FIG. 2, a configuration is illustrated in which the sheet P is conveyed with respect to the fixed reader 400 and is also read in a sub-scanning direction, but the configuration is not limited thereto. For example, a configuration may be employed in which a portion of the reader 400 moves with respect to the sheet P.

Referring back to FIG. 1, the sheet P whose surface has been read by the reader 400 is further conveyed inside the position detection device 4 and discharged to an ejection tray 410.

Although FIG. 1 illustrates an example in which the reader 400 is provided on only one side of the sheet P in the conveyance path of the sheet P in the position detection device 4, the reader 400 may be provided on both sides of the sheet P in order to allow inspection of both sides of the sheet P.

Figure 3:
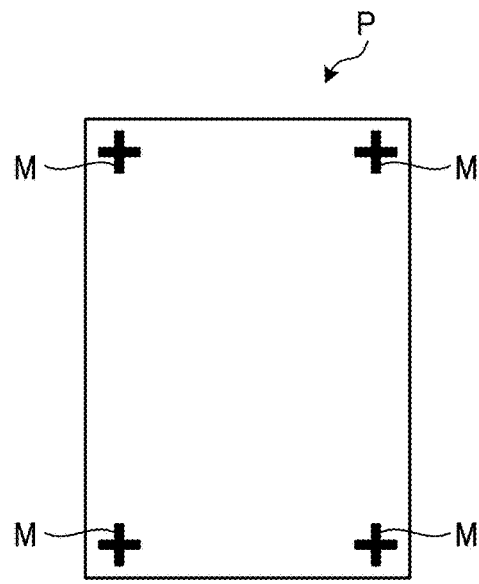
FIG. 3 is a diagram illustrating a sheet and positions of image patterns on the sheet.

FIG. 3 is a diagram illustrating a sheet P and the positions of image patterns on the sheet P. As illustrated in FIG. 3, cross-shaped marks M, which are image patterns, are formed on four corners of the sheet P. The cross marks M are for detecting the position of an image formed on the sheet P. In the present embodiment, only the cross-shaped marks M, which are image patterns for detecting an image formation position, is formed on the sheet P. However, another image (e.g., a user's image) may be formed in an area in which the cross-shaped marks M as image patterns are not formed.

Next, hardware of the position detection device 4 is described.

Figure 4:
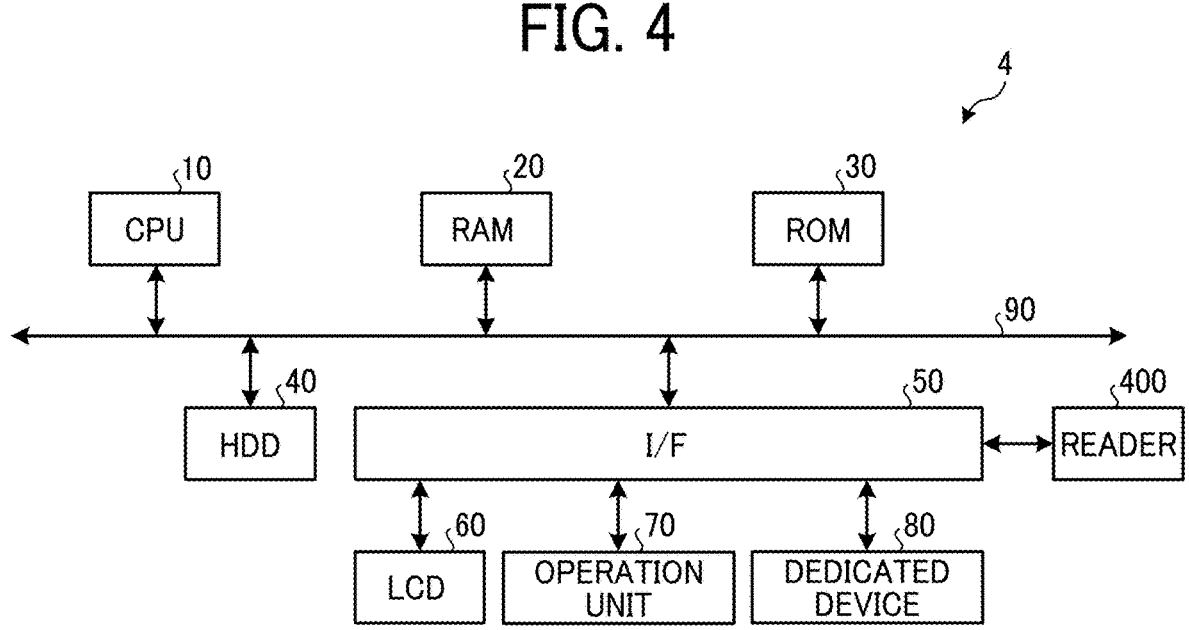
FIG. 4 is a block diagram illustrating an example of a hardware configuration of the position detection device.

FIG. 4 is a block diagram illustrating an example of a hardware configuration of the position detection device 4. As illustrated in FIG. 4, the position detection device 4 has a configuration similar to, for example, an information processing device such as a general personal computer (PC). In other words, the position detection device 4 includes a central processing unit (CPU) 10, a random access memory (RAM) 20, a read only memory (ROM) 30, a hard disk drive (HDD) 40, and an interface (I/F) 50 that are connected via a bus 90. In addition to the reader 400, a liquid crystal display (LCD) 60, an operation unit 70, and a dedicated device 80 are connected to the I/F 50.

The CPU 10 is an arithmetic device that controls operations of the entire position detection device 4. The RAM 20 is a volatile storage medium that allows reading and writing of data at a high speed and is used as a working area when the CPU 10 processes data. The ROM 30 is a non-volatile read only storage medium and stores programs such as firmware. The HDD 40 is a nonvolatile storage medium that allows reading and writing of data, and stores an operating system (OS), various control programs, application programs, and the like.

The I/F 50 connects the bus 90 to various hardware components or networks for control. The LCD 60 is a visual user interface for a user to confirm the state of the position detection device 4. The operation unit 70 is a user interface such as a keyboard or a mouse for a user to input information to the position detection device 4.

The dedicated device 80 is a dedicated arithmetic device that performs image processing at high speed. Such an arithmetic device is configured as, for example, an application specific integrated circuit (ASIC). Image processing in the reader 400 that reads an image output on a sheet P is also implemented by the dedicated device 80.

In such a hardware configuration, the CPU 10 performs computation according to a program stored in the ROM 30 or a program loaded into the RAM 20 from a storage medium, such as the HDD 40 or an optical disc, to implement a software control unit. A combination of the software control unit thus implemented and hardware constructs a functional block to achieve functions of the position detection device 4 according to the present embodiment.

A program to be executed by the position detection device 4 according to the present embodiment is recorded and provided in a computer-readable storage medium, such as a compact disc-read only memory (CD-ROM), a flexible disk (FD), a compact disc-recordable (CD-R), or a digital versatile disk (DVD), in a file in installable or executable format.

The program executed by the position detection device 4 according to the present embodiment may be stored in a computer connected to a network such as the Internet and provided by being downloaded via the network. The program executed by the position detection device 4 according to the present embodiment may be provided or distributed via a network such as the Internet.

Next, a description is given of functions of the position detection device 4 implemented by the combination of the software control unit and the hardware.

Figure 5:
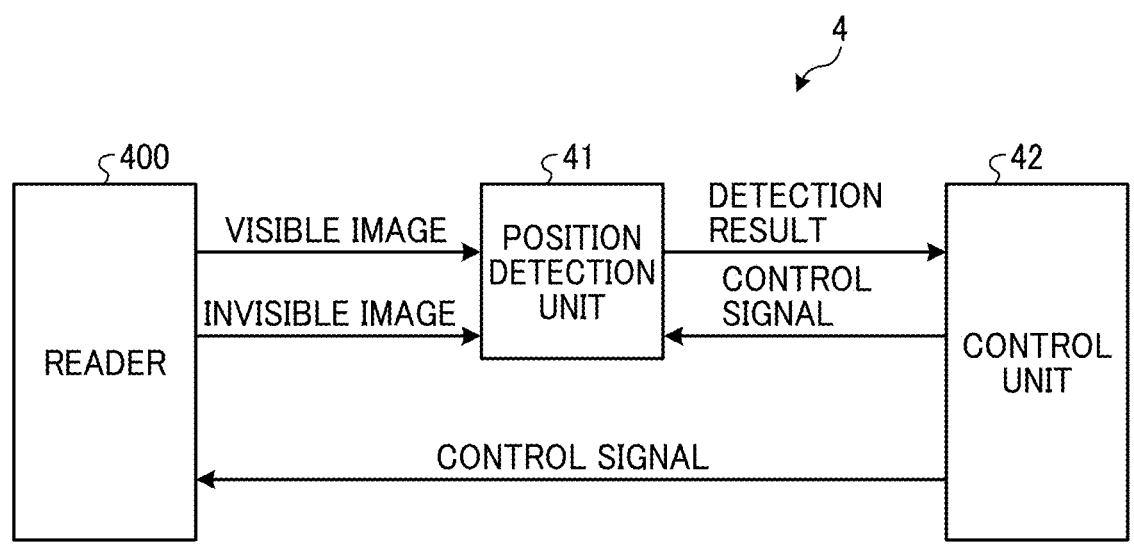
FIG. 5 is a functional block diagram illustrating functions of the position detection device.

FIG. 5 is a functional block diagram illustrating functions of the position detection device 4. As illustrated in FIG. 5, the position detection device 4 includes a position detection unit 41 and a control unit 42.

The position detection unit 41 detects the positions of ends of the sheet P and the positions of the marks M on the sheet P from an image output from the reader 400.

More specifically, the position detection unit 41 calculates a relative positional relationship between the positions of ends of the sheet P and the positions of the marks M, thereby obtaining the position at which the image is formed with respect to the ends of the sheet P. Here, there are two types of images, a visible image and an invisible image. The position detection device 4 according to the present embodiment includes a first mode for detecting the respective positions based on the visible image and a second mode for detecting the respective positions based on the invisible image.

The control unit 42 controls the reader 400 and the position detection unit 41 to perform read-image acquisition and position detection. In addition, the control unit 42 determines which mode (the first mode or the second mode) is used to perform the position detection based on the characteristics of the sheet P and the marks M. Although details will be described later, the characteristics of the sheet P and the marks M serving as a determination reference for selecting the mode (the first mode or the second mode) are absorption characteristics in the invisible wavelength region.

Figure 6:
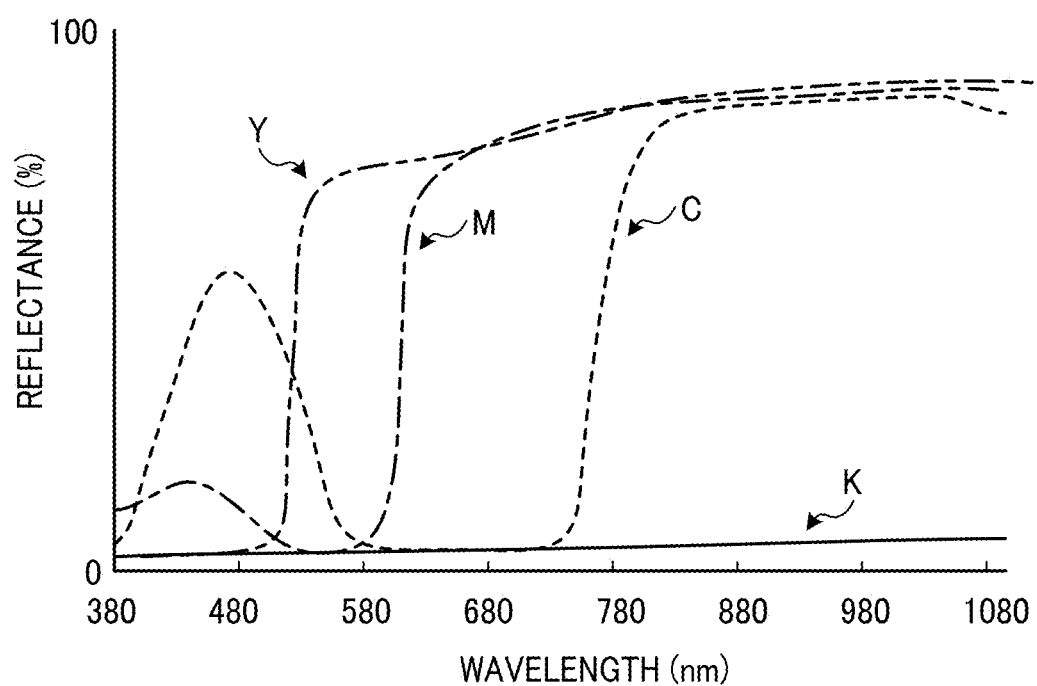
FIG. 6 is a diagram illustrating an example of spectral reflectance when printing is performed on a white sheet of paper with toner of each color.

Here, FIG. 6 is a diagram illustrating an example of the spectral reflectance in the case where printing is performed on a blank sheet with color toners.

Since the imaging element 403 formed of a silicon semiconductor also has sensitivity in the near-infrared region, an existing image sensor can be used as the imaging element 403 by using the near-infrared region as the invisible wavelength region. Thus, invisible image reading can be easily implemented.

As an example, FIG. 6 illustrates the spectral reflectance in the case where printing is performed with toners of K, C, M, Y colors on white sheet of paper (paper having high reflectance at each wavelength). The K toner has high absorption characteristics in a near infrared region (800 nm to 1000 nm) that is an invisible range. Each of the C, M, and Y toners has low absorption characteristics in a near infrared region (800 nm to 1000 nm). Accordingly, marks M with the K toner are formed on the sheet P having low absorption characteristics in the near infrared region (800 nm to 1000 nm), thus allowing position detection using a near infrared image.

FIGS. 7A, 7B, 7C, and 7D are diagrams illustrating examples of a read image.

Figure 7A:
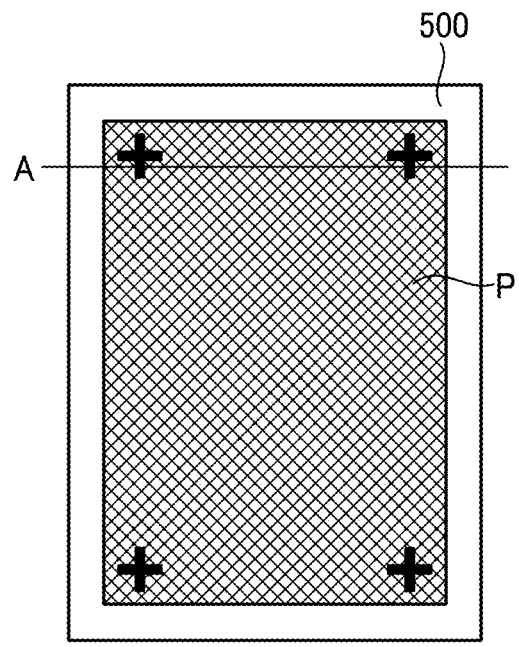
FIGS. 7A, 7B, 7C, and 7D are diagrams illustrating examples of a read image.
Figure 7B:
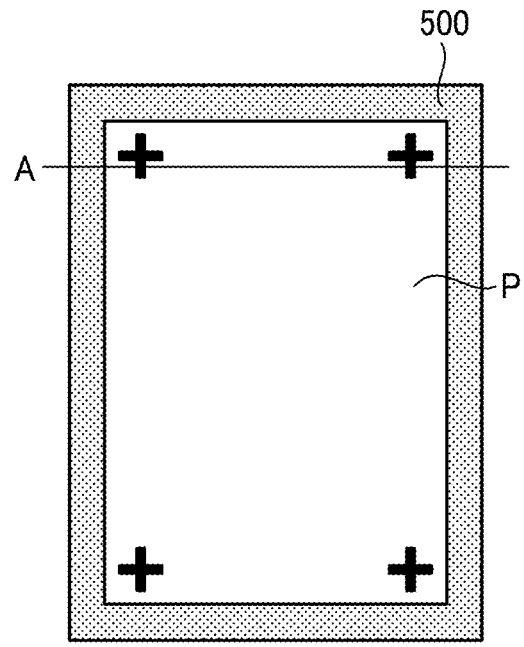
Figure 7C:
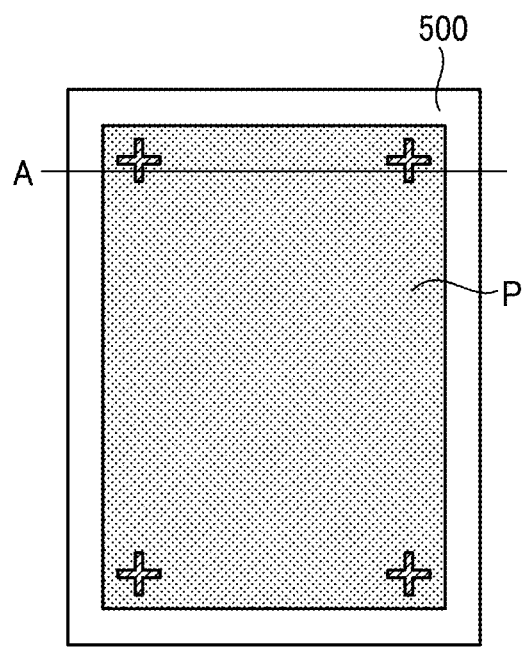
Figure 7D:
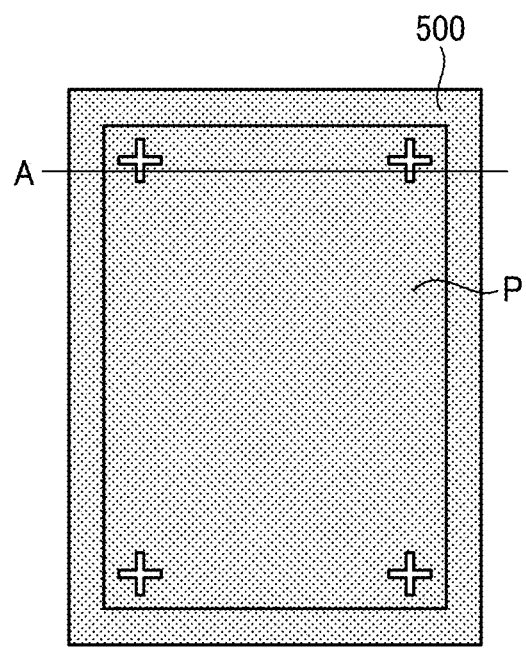

FIG. 7A is an example of a visible image of a sheet having low absorption characteristics in the invisible wavelength region. FIG. 7B is an example of an invisible image of a sheet illustrating low absorption characteristics in the invisible wavelength region. FIG. 7C is an example of a visible image of a sheet having high absorption characteristics in the invisible wavelength region. FIG. 7D is an example of an invisible image of a sheet having high absorption characteristics in the invisible wavelength region.

As illustrated in the visible images of FIGS. 7A and 7C, the background member 500 according to the present embodiment has low absorption characteristics in the visible wavelength region, and thus exhibits a high pixel value (i.e., high brightness).

On the other hand, as illustrated in the invisible images of FIGS. 7B and 7D, the background member 500 according to the present embodiment has high absorption characteristics in the invisible wavelength region, and thus exhibits a low pixel value (i.e., low brightness).

For example, when a white or chromatic color sheet P having low absorption characteristics in the invisible wavelength region, in other words, a sheet P having high reflection characteristics in a specific wavelength region in the visible wavelength region is conveyed, a pixel value corresponding to the color of the sheet P is obtained in the visible image illustrated in FIG. 7A, and a high pixel value is obtained in the invisible image illustrated in FIG. 7B.

On the other hand, for example, in a case where the sheet P exhibiting high absorption characteristics in the visible wavelength region and the invisible wavelength region is conveyed, as illustrated in FIG. 7C, the pixel value of the visible image is low, and as illustrated in FIG. 7D, the pixel value of the invisible image is also low.

In order for the position detection unit 41 to accurately detect the position of the sheet P, it is necessary to increase the difference in pixel value between the background member 500 and the sheet P. This is because when the difference between the pixel values of the background member 500 and the sheet P is small, the position detection accuracy of the position detection unit 41 may be lowered due to noise or the like, or the position of the sheet P may be erroneously detected.

In addition, the position detection unit 41 further detects the positions of the marks M formed on the sheet P in order to detect the image formation position.

In the case of the sheet P exhibiting low absorption characteristics in the invisible wavelength region, a color material exhibiting high absorption characteristics in the invisible wavelength region is used as the color material for forming the marks M indicating the image formation position. Accordingly, in the invisible image, the pixel value difference between the background member 500 and the sheet P and the pixel value difference between the sheet P and the mark M increases, thus allowing the position of the sheet P and the positions of the marks M to be detected with high accuracy.

In a case where a colored sheet instead of white is used as the sheet P, there is a concern that a pixel value difference between the sheet P and the mark M decreases in the visible image. However, in the present embodiment, using the invisible image can increase the pixel value difference by using the difference in absorption characteristics in the invisible wavelength region.

On the other hand, in the case of the sheet P exhibiting high absorption characteristics in the invisible wavelength region, if a color material having a brightness different from the brightness of the sheet P in the visible wavelength region is used as the color material for forming the marks M indicating the image formation position, the positions of the marks M in the visible image can be detected.

However, the marks M are preferably formed using a color material exhibiting low absorption characteristics in the visible wavelength region. In the present embodiment, a black sheet P is taken as an example of a sheet P that exhibits high absorption characteristics in the invisible wavelength region. In general, carbon black used for realizing black exhibiting high absorption characteristics in a visible wavelength region exhibits high absorption characteristics even in an invisible wavelength region. Accordingly, the sheet P exhibiting high absorption characteristics even in the invisible wavelength region exhibits high absorption characteristics even in the visible wavelength region. Therefore, if the marks M are formed using a color material exhibiting low absorption characteristics in the visible wavelength region, the pixel value difference between the sheet P and the marks M in the visible image increases. Thus, both the position of the sheet P and the positions of the marks M can be detected with high accuracy.

The color material having high brightness in the visible wavelength region does not necessarily be a color material exhibiting low absorption characteristics in the entire visible region like white, and may be a color material exhibiting low absorption characteristics in a part of the visible region like yellow.

Figure 8A:
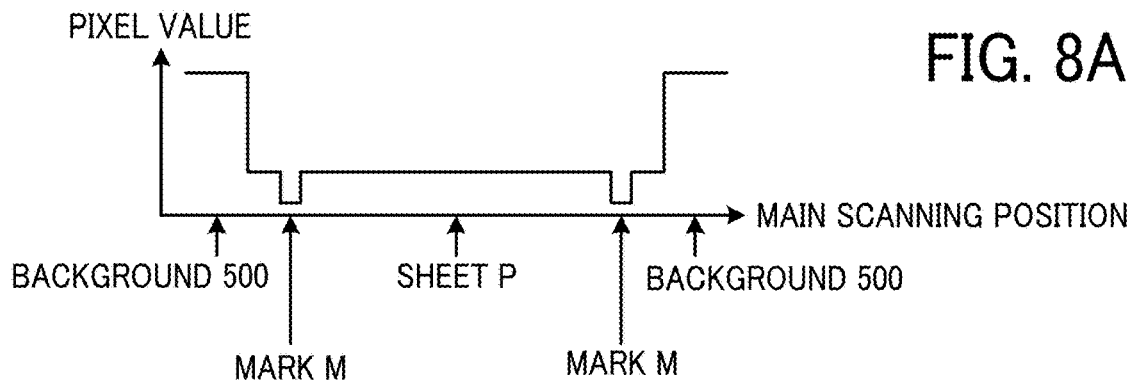
FIGS. 8A, 8B, 8C, and 8D are diagrams illustrating examples of pixel values (of one line) of a read image.
Figure 8B:
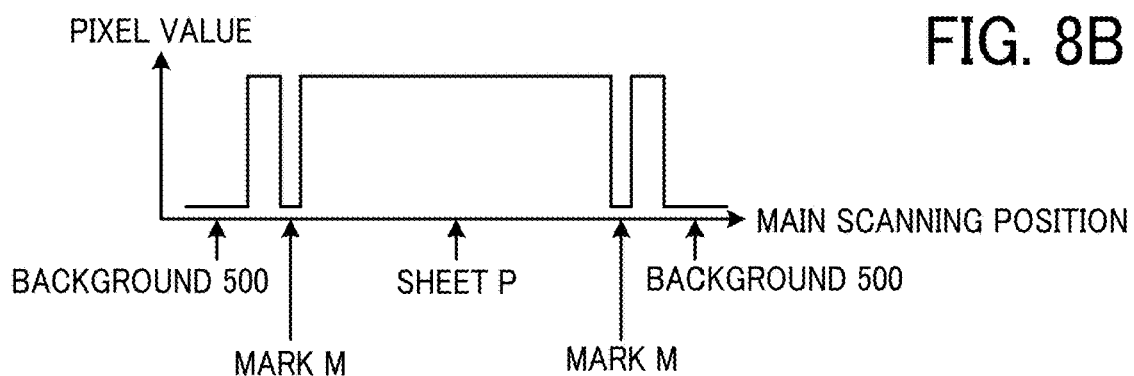
Figure 8C:
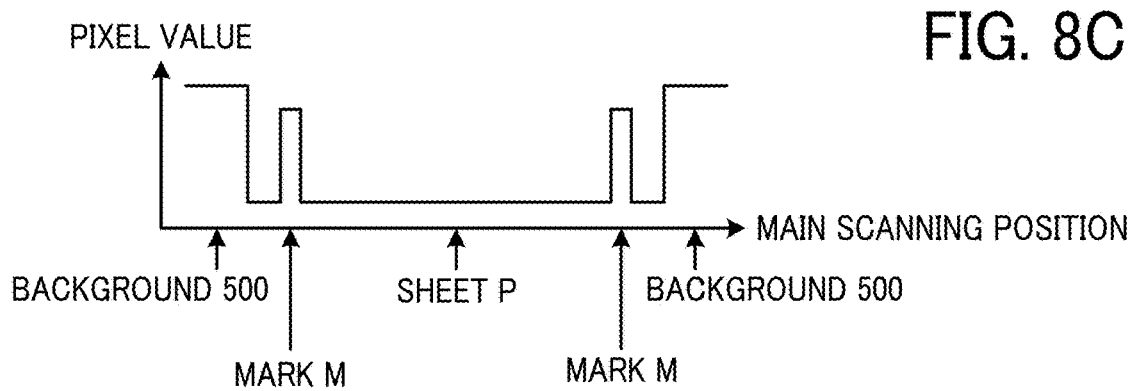
Figure 8D:
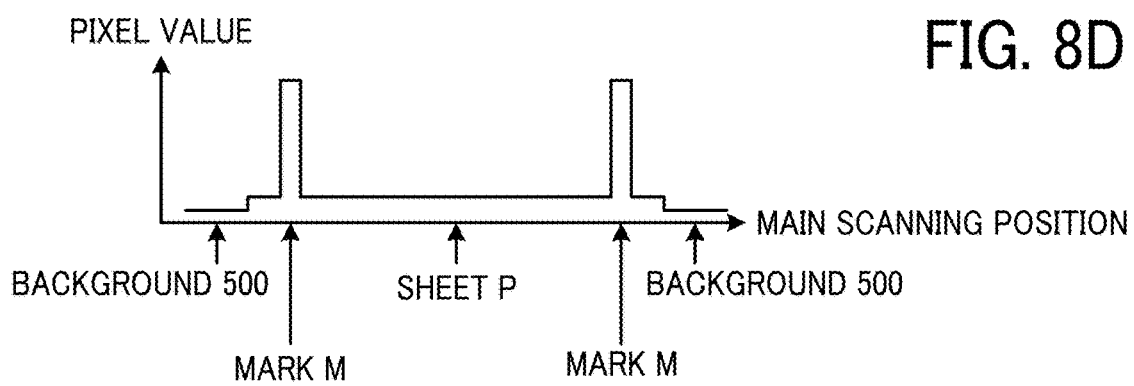

FIGS. 8A, 8B, 8C, and 8D are diagrams illustrating an example of pixel values of a read image (one line). FIGS. 8A, 8B, 8C, and 8D illustrate only the pixel values of one line at the position A in each read image illustrated in FIGS. 7A, 7B, 7C, and 7D. In other words, FIG. 8A illustrates an example of pixel values of a visible image of a sheet exhibiting low absorption characteristics in the invisible wavelength region. FIG. 8B illustrates an example of pixel values of an invisible image of a sheet exhibiting low absorption characteristics in the invisible wavelength region. FIG. 8C illustrates an example of pixel values of a visible image of a sheet exhibiting high absorption characteristics in the invisible wavelength region. FIG. 8D illustrates an example of pixel values of an invisible image of a sheet exhibiting high absorption characteristics in the invisible wavelength region.

The position detection unit 41 determines a specific threshold, detects a position across the threshold at the boundary between the background member 500 and the region of the sheet P as the end position of the sheet P, and detects a position across the threshold at the boundary between the region of the sheet P and the region of the mark M as the position of the mark M.

In FIG. 8A, the background member 500 exhibits low absorption characteristics in the visible wavelength region, and thus has a high pixel value. Since a color sheet of paper having a relatively high density is taken as an example of the sheet P, the pixel value of the region of the sheet P is low. Since the marks M are formed using a color material that exhibits higher absorption characteristics than the sheet P in both the visible wavelength region and the invisible wavelength region, such as black, the pixel value of the mark region is low. Accordingly, since the pixel value difference between the background member 500 and the region of the sheet P is large, the position detection unit 41 can detect the positions of the ends of the sheet P with high accuracy.

On the other hand, as illustrated in FIG. 8A, since the pixel value difference between the region of the sheet P and the region of the mark M is small, the accuracy of detecting the mark position decreases. This is because it is difficult to set an appropriate threshold if the pixel value difference is small since the pixel value fluctuates due to density fluctuation of the mark M or noise during reading, and the threshold may be exceeded at a position other than the true end positions of the sheet P or the positions of the marks M.

In addition, the sheet P does not necessarily exhibit high absorption characteristics in the entire visible wavelength region and may exhibit low absorption characteristics in the visible wavelength region. Accordingly, when a specific visible image among the visible images of RGB is used, the pixel value of the region of the sheet P can be increased. Thus, the pixel value difference between the region of the sheet P and the region of the mark M can be increased. However, in such a case, the pixel value difference between the background member 500 and the region of the sheet P decreases.

Therefore, in the example illustrated in FIG. 8A, the position detection unit 41 cannot detect both the end position of the sheet P and the position of the mark M with high accuracy.

In FIG. 8B, since the background member 500 exhibits high absorption characteristics in the invisible wavelength region, the pixel value is low. Since the sheet P exhibits a lower absorption characteristic in the invisible wavelength region than the background member 500, the pixel value of the region of the sheet P is relatively high. In addition, since the marks M are formed using a color material that exhibits higher absorption characteristics than the sheet P in both the visible wavelength region and the invisible wavelength region, such as black, the pixel value in the region of each mark M is low. Accordingly, since the pixel value difference between the background member 500 and the region of the sheet P and the pixel value difference between the region of the sheet P and the region of the mark M are large, the position detection unit 41 can detect both the end position of the sheet P and the position of the mark M with high accuracy. In other words, when the reader 400 reads the sheet P on which the marks M are formed with a color material having higher absorption characteristics than the sheet P in the invisible wavelength region and lower absorption characteristics than the background member 500 in the invisible wavelength region, the position detection unit 41 performs position detection using the invisible image as the read image. For example, in the case of detecting a black toner mark M (having similar absorption characteristics in both the visible wavelength region and the invisible wavelength region) formed on white sheet of paper (having similar absorption characteristics in both the visible wavelength region and the invisible wavelength region) that is the sheet P, highly accurate position detection can be performed using an invisible image.

In FIG. 8C, the background member 500 has low absorption characteristics in the visible wavelength region and thus has a high pixel value. As an example of the sheet P, a sheet that exhibits higher absorption characteristics than the background member 500 in both the visible wavelength region and the invisible wavelength region is used, and thus the pixel value of the region of the sheet P is low. In addition, since the marks M are formed using a color material that has high brightness and exhibits lower absorption characteristics than the sheet P in the visible wavelength region, the pixel value in the region of each mark M is high. Accordingly, since the pixel value difference between the background member 500 and the region of the sheet P and the pixel value difference between the region of the sheet P and the region of the mark M are large, the position detection unit 41 can detect both the end position of the sheet P and the position of the mark M with high accuracy. In other words, when the reader 400 reads the sheet P on which the marks M are not formed with the color material having higher absorption characteristics than the sheet P in the invisible wavelength region or when the reader 400 reads the sheet P having no lower absorption characteristics than the background member 500 in the invisible wavelength region, the position detection unit 41 performs position detection using the visible image as the read image. For example, in a case where the absorption characteristics of the background member 500 and the sheet P in the invisible wavelength region are equivalent to each other or in a case where the absorption characteristics of the sheet P and the color material of the mark M in the invisible wavelength region are equivalent to each other, highly accurate position detection can be performed using the visible image.

In FIG. 8D, since the background member 500 exhibits high absorption characteristics in the invisible wavelength region, the pixel value is low. As an example of the sheet P, a sheet that exhibits higher absorption characteristics than the background member 500 in both the visible wavelength region and the invisible wavelength region is used, and thus the pixel value of the region of the sheet P is low. In addition, since the marks M are formed using a color material that has high brightness and exhibits lower absorption characteristics than the sheet P in the invisible wavelength region, the pixel value of the region of each mark M is high. Accordingly, since the pixel value difference between the region of the sheet P and the region of the mark M is large, the position detection of the marks M can be performed with high accuracy.

On the other hand, as illustrated in FIG. 8D, since the pixel value difference between the background member 500 and the region of the sheet P is small, the position detection accuracy of the end portions of the sheet P is low. This is because it is difficult to set an appropriate threshold value if the pixel value difference is small since the pixel value varies due to the absorption characteristics of each sheet P or noise during reading, and the threshold value may be exceeded at a position other than the true end positions of the sheet P or the positions of the marks M.

As described above, in the present embodiment, an appropriate image is selected from the visible image or the invisible image as an image for position detection according to the absorption characteristics of the sheet P and the color material forming the marks M in the visible wavelength region and the invisible wavelength region. Thus, the positions of both the end portion of the sheet P and the mark M can be detected with high accuracy in various sheets P.

The control unit 42 selects the second mode in which the position detection is performed using the invisible image when the sheet P exhibiting low absorption characteristics in the invisible wavelength region is conveyed and the marks M are formed on the sheet P with the color material exhibiting high absorption characteristics in the invisible wavelength region. When the sheet P exhibiting high absorption characteristics in the invisible wavelength region is conveyed, the control unit 42 selects the first mode in which the position detection is performed using the visible image. Such a configuration allows position detection to be performed on various sheets P without switching the background member 500.

Here, a description is given of the determination of the absorption characteristics of the sheet P and the marks M in the invisible wavelength region in order to select either the first mode or the second mode.

Figure 9:
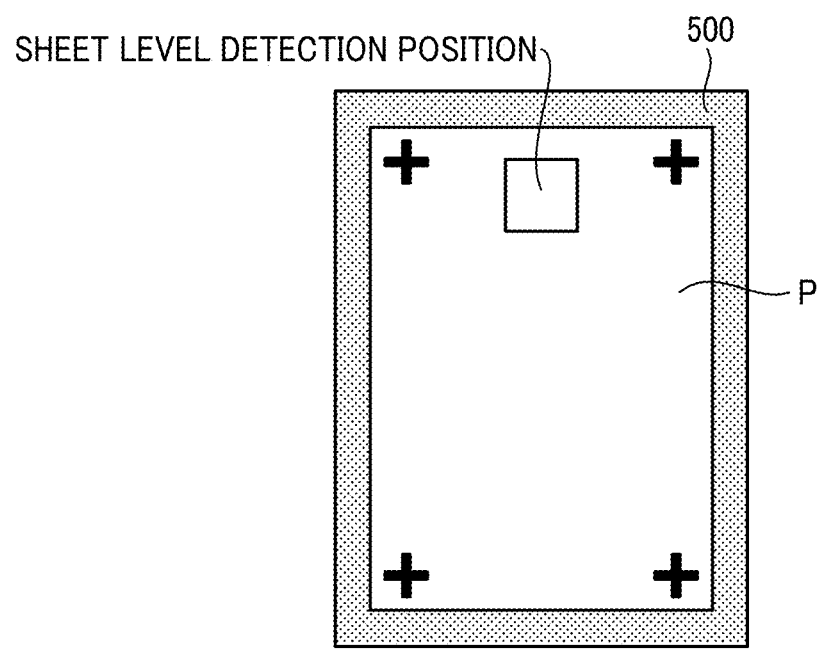
FIG. 9 is a diagram illustrating an example of invisible data of a sheet exhibiting low absorption characteristics in an invisible wavelength region.

Here, FIG. 9 is a diagram illustrating an example of invisible data of the sheet P illustrating low absorption characteristics in an invisible wavelength region. In order to select either the first mode or the second mode, the control unit 42 determines the absorption characteristics of the sheet P and the marks M in the invisible wavelength region. In the present embodiment, the control unit 42 makes a determination based on the pixel value of the sheet P or the pixel value of the mark M of the invisible image.

For example, as illustrated in FIG. 9, when the pixel value at a level detection position of a sheet P in an invisible image is higher than a threshold value, the control unit 42 determines that the sheet P exhibits low absorption characteristics in the invisible wavelength region, and adopts the position detection result by the invisible image.

In other words, the control unit 42 determines whether the reader 400 has read a sheet P in which at least a part of the mark M is formed of a color material having higher absorption characteristics in the invisible wavelength region than in the visible wavelength region and has lower absorption characteristics in the invisible wavelength region than in the visible wavelength region, based on the pixel values of the sheet P and the marks M in the invisible image.

Accordingly, the control unit 42 can select a mode (the first mode or the second mode) in which the position can be detected with high accuracy without the user inputting information on the sheet P.

Figure 10:
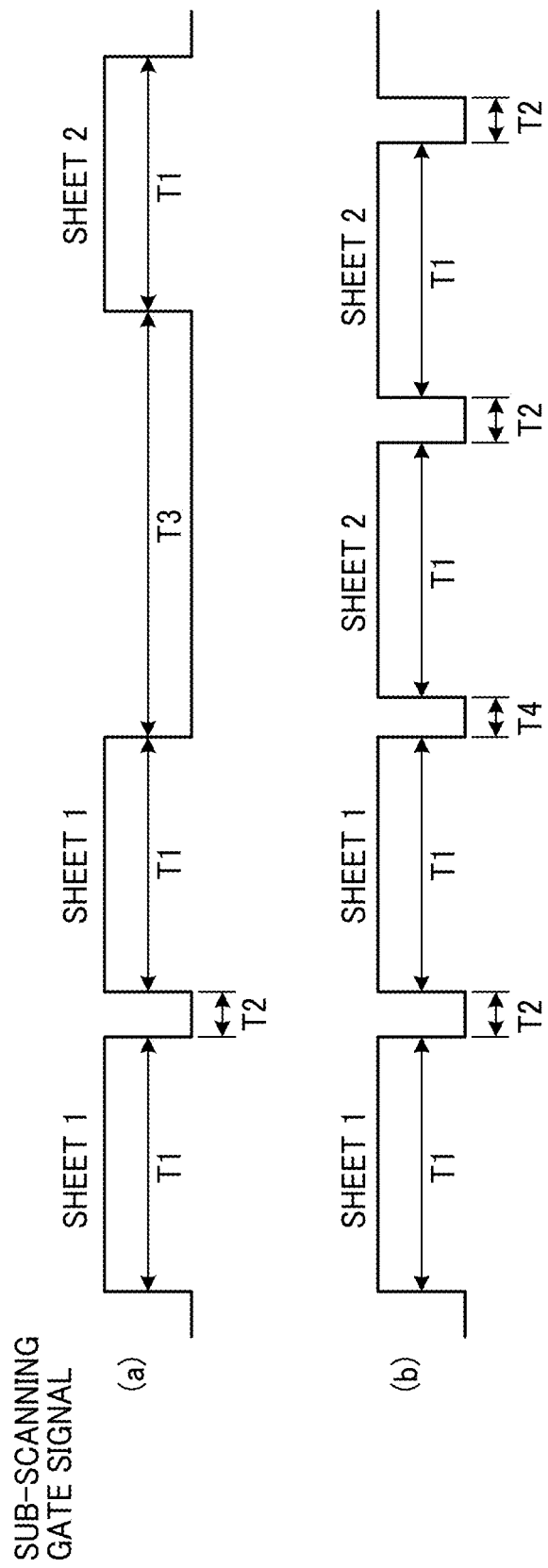
FIG. 10 is a timing chart illustrating sub-scanning gate signals in reading operation.

FIG. 10 is a timing chart illustrating sub-scanning gate signals in reading operation.

Part (a) of FIG. 10 is a timing chart in a comparative case where it is necessary to switch the background member 500 when different sheets P are continuously read. A period T1 in which the sub-scanning gate signal is asserted is a period in which a read image is acquired, and is controlled by the control unit 42 so as to be longer than the sub-scanning length of the sheet P. This is for detecting the leading end position and the trailing end position of the sheet P in the sub-scanning direction. Further, as illustrated in part (a) of FIG. 10, since the previous sheet P and the next sheet P are conveyed with an interval therebetween, there is a period T2 in which no read image is acquired.

Further, as illustrated in part (a) of FIG. 10, if a sheet 2 having a different characteristic (color) is conveyed after two sheets 1 are conveyed and the background member 500 is switched, a time for switching the background member 500 and a stabilization waiting time until vibration or the like is eliminated after the switching are generated, and thus it is necessary to provide an interval of a T3 period. For this reason, according to the comparative case illustrated in part (a) of FIG. 10, a downtime occurs between the reading of the sheet 1 and the reading of the sheet 2, and productivity decreases.

On the other hand, part (b) of FIG. 10 is a timing chart in a case where switching of the background member 500 is not necessary when different types of sheets P are continuously read in the present embodiment. As illustrated in part (b) of FIG. 10, according to the present embodiment, even if a sheet 2 having a different characteristic (color) is conveyed after a sheet 1, the control unit 42 only needs to switch the reading mode without switching the background member 500, does not need mechanical driving, and can cope with the sheet 2 only by providing a sheet conveyance interval T4 satisfying T3>T4. In other words, the position detection device 4 according to the present embodiment can reduce downtime and enhance productivity as compared with the comparative case. In other words, according to the present embodiment, the end positions and the image formation position can be detected with high accuracy in various types of recording media with a simple configuration without reducing productivity.

As described above, according to the present embodiment, as compared with the comparative case in which background members 500 having a plurality of densities are switched to correspond to the sheet P, the end positions of various types of sheets P and the positions of the marks M formed on the sheet P can be detected without switching the background member 500. Accordingly, the switching time of the background member 500 and stabilization waiting time after switching can be obviated, thus enhancing productivity. In addition, a configuration for switching the background member 500 can be obviated, thus allowing the apparatus to be simplified.

Further, according to the present embodiment, a black color material containing carbon black is used as a color material exhibiting high absorption characteristics even in the invisible wavelength region. Thus, the end positions and an image formation position of various sheets of sheet P can be detected with high accuracy without lowering productivity with a simple configuration. Note that, alternatively, an invisible toner may be that exhibits low absorption characteristics in a visible wavelength region and exhibits high absorption characteristics only in an invisible wavelength region.

Second Embodiment

Next, a description is given of a position detection device according to a second embodiment of the present disclosure.

The second embodiment is different from the first embodiment in that determination is made based on the set information of the sheet P. In the following, descriptions of the configurations equivalent to the configurations of the first embodiment are omitted, and features of the second embodiment different from the first embodiment are mainly described.

Figure 11:
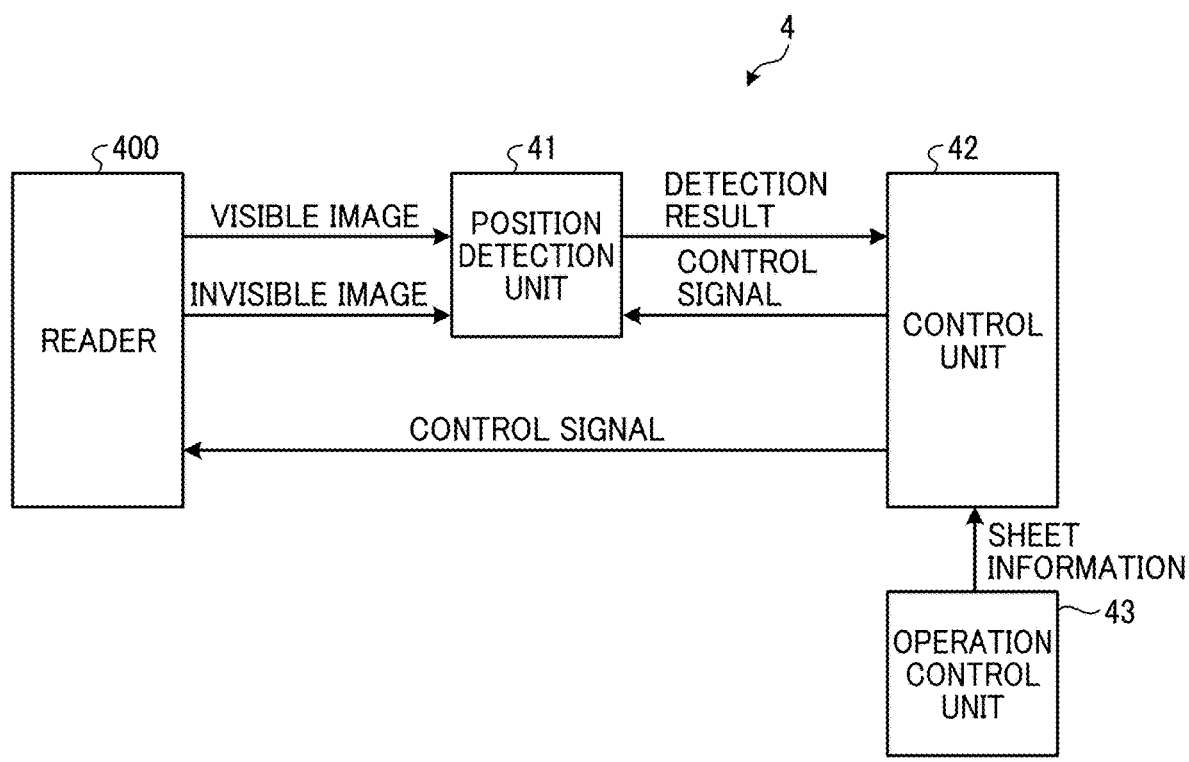
FIG. 11 is a block diagram illustrating functions of a position detection device according to a second embodiment of the present disclosure.

FIG. 11 is a block diagram illustrating functions of the position detection device 4 according to the second embodiment. In order to select either the first mode or the second mode, the control unit 42 according to the present embodiment determines the absorption characteristics of the sheet P and the marks M in the invisible wavelength region, based on set information on the sheet P.

As illustrated in FIG. 11, the position detection device 4 further includes an operation control unit 43 in addition to the configuration of the first embodiment. The operation control unit 43 transmits, to the control unit 42, information on the sheet P input by the user via the operation unit 70.

The control unit 42 determines whether the reader 400 has read the sheet P having low absorption characteristics in the invisible wavelength region in which at least a part of the mark M is formed of the color material having high absorption characteristics in the invisible wavelength region, based on the information of the sheet P input and set by the user.

The information of the sheet P may be setting values that directly indicate the absorption characteristics of the sheet P and the marks M in the invisible wavelength region or may be information that indirectly indicates the absorption characteristics in the invisible wavelength region. For example, since the absorption characteristics in the invisible wavelength region change depending on whether carbon black is contained as described above, the absorption characteristics in the invisible wavelength region may be input by setting the color (black or other color) of the sheet P.

As described above, according to the present embodiment, determination based on a read image can be obviated, thus allowing control by the control unit 42 to be simplified.

Third Embodiment

Next, a description is given of a position detection device according to a third embodiment of the present disclosure.

The third embodiment is different from the first embodiment or the second embodiment in that a correction value for forming an image at a predetermined position is calculated from the end positions of the sheet P detected by the position detection unit 41 and the positions of the marks M. Hereinafter, in the description of the third embodiment, descriptions of configurations equivalent to the configurations of the first embodiment or the second embodiment are omitted, and portions different from those of the first embodiment or the second embodiment are mainly described.

Figure 12:
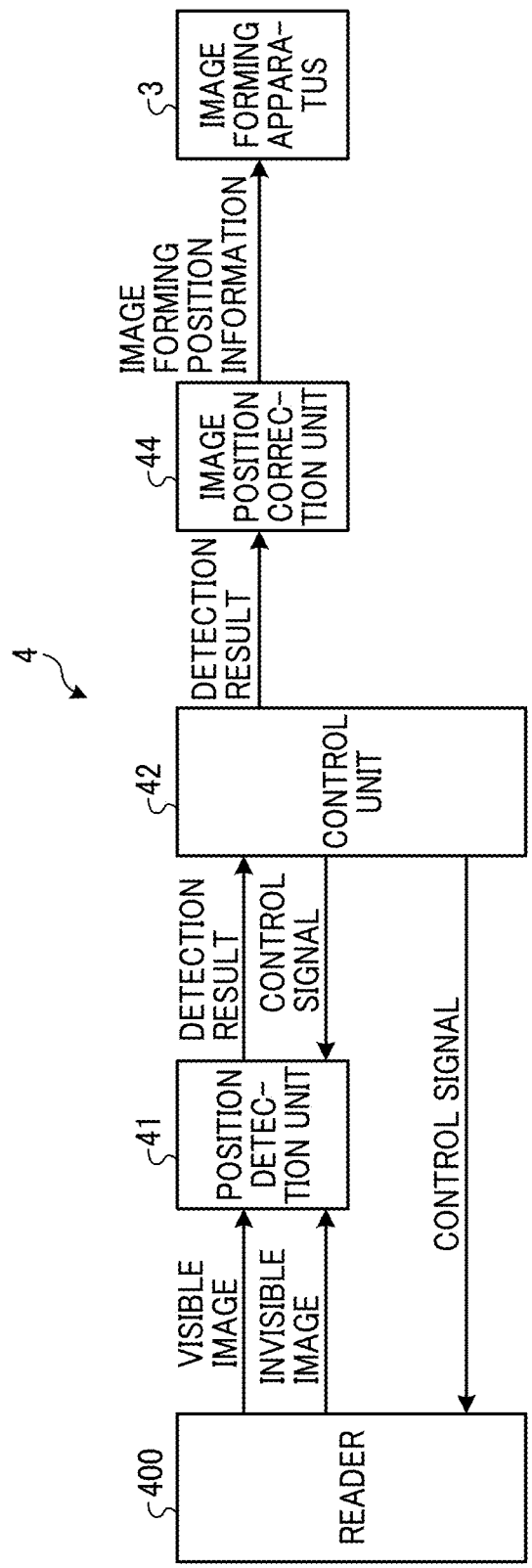
FIG. 12 is a block diagram illustrating functions of a position detection device according to a third embodiment of the present disclosure.

FIG. 12 is a block diagram illustrating functions of the position detection device 4 according to the third embodiment. As illustrated in FIG. 12, the position detection device 4 further includes an image position correction unit 44 in addition to the configuration of the first embodiment.

The image position correction unit 44 calculates a correction value for forming an image at a predetermined position, based on the end positions of the sheet P and the positions of the marks M detected by the position detection unit 41. The image position correcting unit 44 outputs image formation position information to the image forming device 3.

The image forming device 3 changes image forming conditions based on the information on image formation position and performs control so that an image is formed at a predetermined position. Here, the image forming conditions changed for changing the image formation position is, for example, an image formation timing. Accordingly, the distance from the end of the sheet P to the image position changes, thus allowing an image to be formed at the predetermined position.

The image forming device 3 uses a color material exhibiting high absorption characteristics in the invisible wavelength region when forming the marks M, in order to perform position detection using an invisible image on the sheet P exhibiting low absorption characteristics in the invisible wavelength region in the position detection unit 41. Accordingly, in the invisible image, the pixel value difference between the background member 500 and the sheet P and the pixel value difference between the sheet P and the mark M increases, thus allowing the position of the sheet P and the positions of the marks M to be detected with high accuracy.

In other words, the image forming device 3 forms at least a part of the mark M with a color material having high absorption characteristics in the invisible wavelength region on the sheet P having low absorption characteristics in the invisible wavelength region.

In a case where a colored sheet instead of white is used as the sheet P, there is a concern that the pixel value difference between the sheet P and the mark M is relatively small in the visible image. However, using the invisible image allows the pixel value difference to be increased by using a difference in absorption characteristics in the invisible wavelength region. In addition, switching of the background member 500 can be obviated, thus preventing a decrease in productivity in the position detection unit 41 and enhancing the productivity of the image forming system 1.

In addition, in order to perform position detection with high accuracy using a visible image with respect to a sheet exhibiting high absorption characteristics in the invisible wavelength region in the position detection unit 41, a color material having high brightness in a specific region of the visible wavelength region is used when forming the mark M in the image forming device 3. The color material having high lightness does not necessarily be a color material exhibiting low absorption characteristics in the entire visible region like white, and may be a color material exhibiting low absorption characteristics in a part of the visible region like yellow. Thus, the positions of the marks M can be detected with high accuracy even in the sheet P having high absorption characteristics in the invisible wavelength region.

In other words, the image forming device 3 forms at least a part of the mark M with a color material exhibiting low absorption characteristics in a specific region of the visible wavelength region on the sheet P having high absorption characteristics in the invisible wavelength region.

As described above, according to the present embodiment, image formation positions of various types of sheets P can be corrected without switching the background member 500 in the position detection device 4, thus enhancing productivity.

Further, according to the present embodiment, the positions of the marks M can be detected with high accuracy even in the sheet P having high absorption characteristics in the invisible wavelength region.

Fourth Embodiment

Next, a description is given of a position detection device according to a fourth embodiment of the present disclosure.

The fourth embodiment is different from the first embodiment to the third embodiment in that determination is performed based on set information of the sheet P and a correction value for forming an image at a predetermined position is calculated from the end position of the sheet P and the positions of the marks M detected by the position detection unit 41. Hereinafter, in the description of the fourth embodiment, the description of configurations equivalent to the configurations of the first embodiment to the third embodiment are omitted, and portions different from those of the first embodiment to the third embodiment are mainly described.

Figure 13:
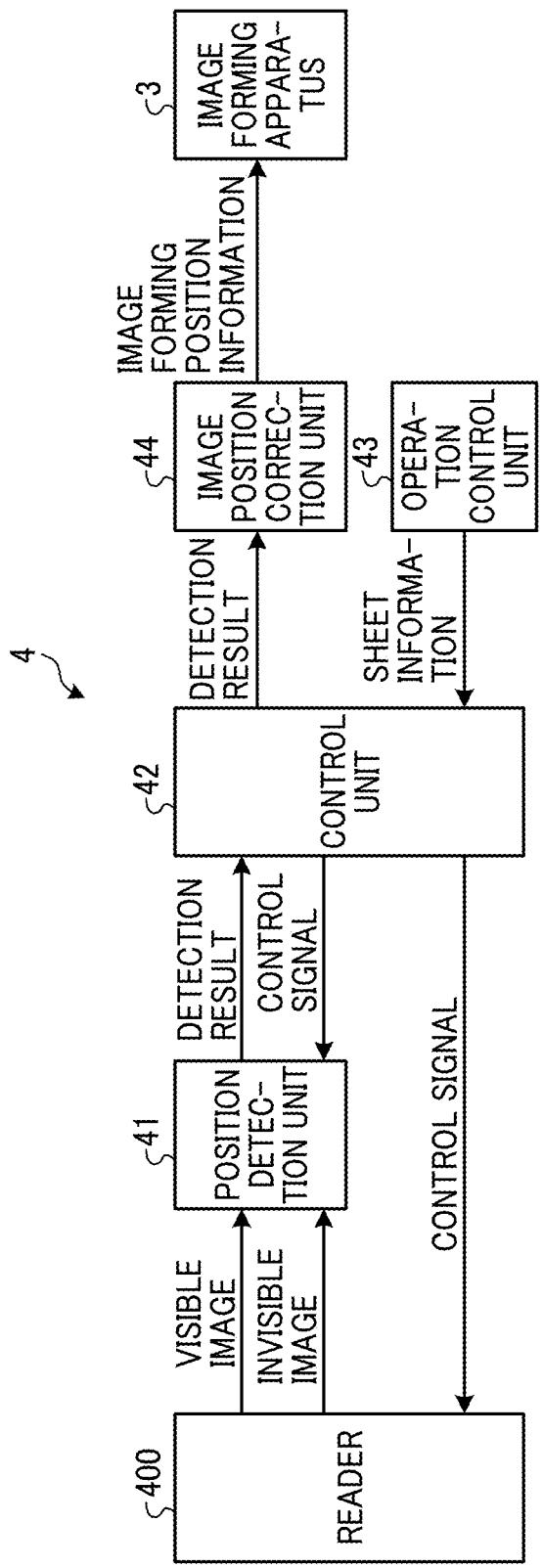
FIG. 13 is a block diagram illustrating functions of a position detection device according to a fourth embodiment of the present disclosure.

FIG. 13 is a block diagram illustrating functions of the position detection device 4 according to the fourth embodiment. As illustrated in FIG. 13, the position detection device 4 further includes an operation control unit 43 and an image position correction unit 44 in addition to the configuration of the first embodiment.

The operation control unit 43 transmits, to the control unit 42, information on the sheet P input by the user via the operation unit 70.

The information of the sheet P may be setting values that directly indicate the absorption characteristics of the sheet P and the marks M in the invisible wavelength region or may be information that indirectly indicates the absorption characteristics in the invisible wavelength region. For example, since the absorption characteristics in the invisible wavelength region change depending on whether carbon black is contained as described above, the absorption characteristics in the invisible wavelength region may be input by setting the color (black or other color) of the sheet P.

The control unit 42 selects the color material for forming the marks M based on the set information of the sheet P.

The image forming device 3 changes the color material to the color material selected by the control unit 42 according to the set information of the sheet P, and forms the marks M. Such a configuration facilitates the control at the time of forming the marks M and thus can reduce the consumption of the coloring material due to unnecessary formation of marks M.

For example, in order to perform position detection using an invisible image on a sheet P that exhibits low absorption characteristics in the invisible wavelength range in the position detection unit 41, the control unit 42 selects a color material that exhibits high absorption characteristics in the invisible wavelength range when a setting corresponding to a sheet P that exhibits low absorption characteristics in the invisible wavelength range is made.

In addition, for example, in order to perform position detection with high accuracy using a visible image with respect to the sheet P exhibiting high absorption characteristics in the invisible wavelength region in the position detection unit 41, when setting corresponding to the sheet P exhibiting high absorption characteristics in the invisible wavelength region is performed, the control unit 42 selects a color material exhibiting low absorption characteristics in a specific region of the visible wavelength region.

The color material for forming the marks M is selected according to the information of the sheet P set in this manner, thus facilitating the control at the time of forming the marks M. Further, since the marks M are formed with the minimum necessary color material, the consumption of the color material due to unnecessary formation of the marks M can be reduced.

The image forming device 3 uses a color material exhibiting high absorption characteristics in the invisible wavelength region when forming the marks M, in order to perform position detection using an invisible image on the sheet P exhibiting low absorption characteristics in the invisible wavelength region in the position detection unit 41. Accordingly, in the invisible image, the pixel value difference between the background member 500 and the sheet P and the pixel value difference between the sheet P and the mark M increases, thus allowing the position of the sheet P and the positions of the marks M to be detected with high accuracy.

The image position correction unit 44 calculates a correction value for forming an image at a predetermined position, based on the end positions of the sheet P and the positions of the marks M detected by the position detection unit 41. The image position correcting unit 44 outputs image formation position information to the image forming device 3.

The image forming device 3 changes image forming conditions based on the information on image formation position and performs control so that an image is formed at a predetermined position. Here, the image forming conditions changed for changing the image formation position is, for example, an image formation timing. Accordingly, the distance from the end of the sheet P to the image position changes, thus allowing an image to be formed at the predetermined position.

As described above, according to the present embodiment, the control at the time of forming the mark M is facilitated and the consumption of the coloring material due to the unnecessary formation of the marks M can be reduced.

Fifth Embodiment

Next, a description is given of a position detection device according to a fifth embodiment of the present disclosure.

The fifth embodiment is different from the first to fourth embodiments in that the image forming device 3 forms both a mark M1 formed of a color material having high absorption characteristics in the invisible range and a mark M2 formed of a color material having low absorption characteristics in the visible range on the sheet P, regardless of the absorption characteristics of a sheet P, as marks for detecting the image formation position. Hereinafter, in the description of the fifth embodiment, the description of configurations equivalent to the configurations of the first embodiment to the fourth embodiment are omitted, and portions different from those of the first embodiment to the fourth embodiment are mainly described.

Figure 14A:
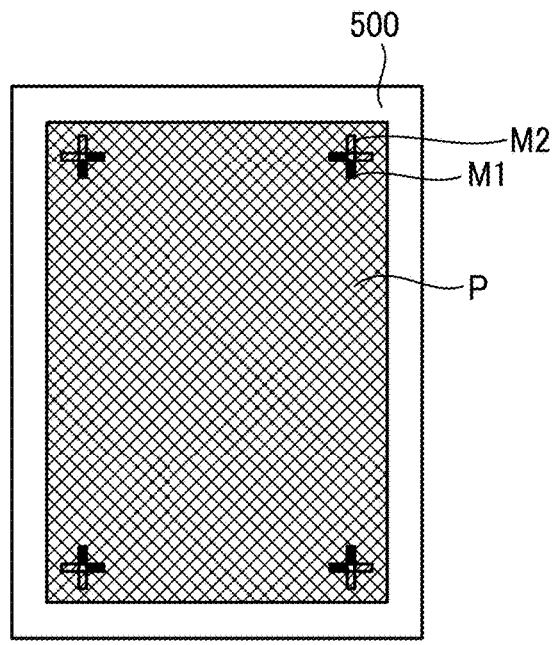
FIGS. 14A, 14B, 14C, and 14D are diagrams illustrating examples of a read image according to a fifth embodiment of the present disclosure.
Figure 14B:
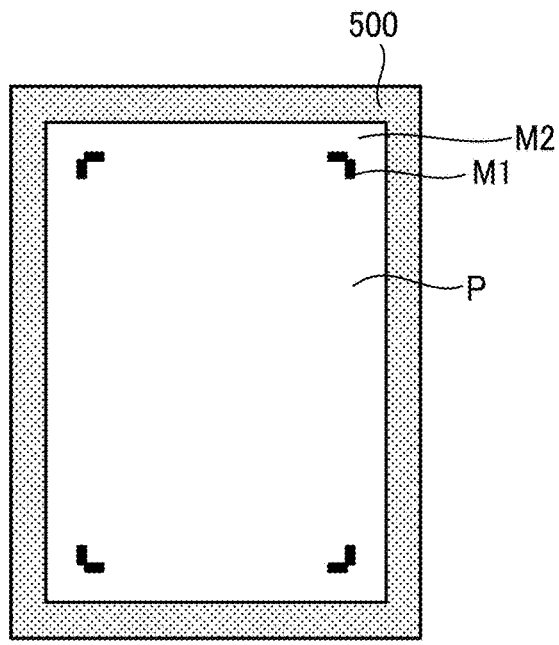
Figure 14C:
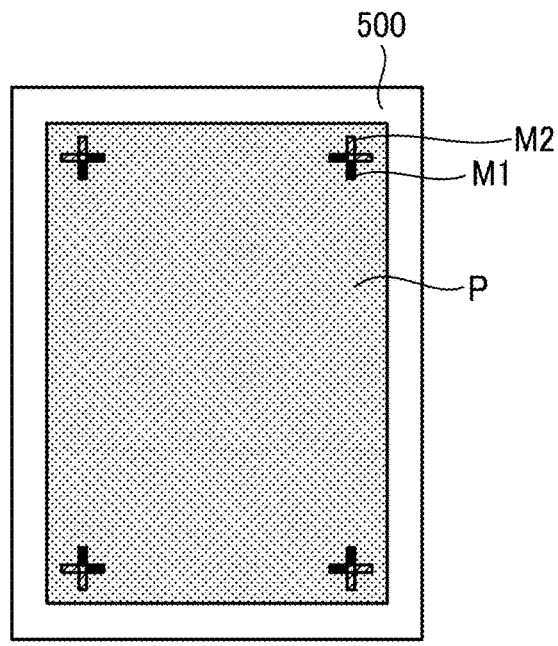
Figure 14D:
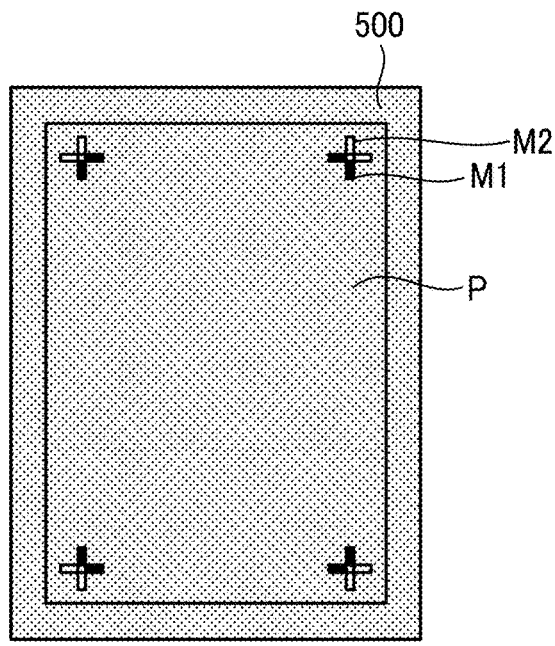

FIGS. 14A, 14B, 14C, and 14D are diagrams illustrating examples of a read image according to the fifth embodiment. FIG. 14A is an example of a visible image of a sheet having low absorption characteristics in the invisible wavelength region. FIG. 14B is an example of an invisible image of a sheet illustrating low absorption characteristics in the invisible wavelength region. FIG. 14C is an example of a visible image of a sheet having high absorption characteristics in the invisible wavelength region. FIG. 14D is an example of an invisible image of a sheet having high absorption characteristics in the invisible wavelength region.

As illustrated in FIG. 14, in the present embodiment, the image forming device 3 forms both a mark M1 formed of a color material having high absorption characteristics in the invisible range and a mark M2 formed of a color material having low absorption characteristics in the visible range on a sheet P, regardless of the absorption characteristics of the sheet P, as marks for detecting the image formation position.

In other words, the image forming device 3 forms at least a part of marks on the sheet P with both the color material having high absorption characteristics in the invisible wavelength region and the color material having low absorption characteristics in a specific region of the visible wavelength region.

As described above, according to the present embodiment, since the fixed marks can be used regardless of the sheet P, thus facilitating formation of the marks.

In the above-described embodiment, the example is described in which the position detection device 4 according to an embodiment of the present disclosure is applied to the image forming system 1 that is a printer. However, in some embodiments, the position detection device 4 may be applied to any image processing device such as a copying machine, a scanner device, a facsimile device, or a multi-function peripheral having at least two functions of a copy function, a printer function, a scanner function, and a facsimile function.

The above-described embodiments are illustrative and do not limit the present disclosure. In addition, the embodiments and modifications or variations thereof are included in the scope and the gist of the invention, and are included in the invention described in the claims and the equivalent scopes thereof. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A position detection device, comprising:
a background member having a higher absorption characteristic in an invisible wavelength region than in a visible wavelength region;
a reader disposed opposite the background member and configured to irradiate a recording medium having a mark and the background member with light of a visible wavelength to output a visible image or with light of an invisible wavelength to output an invisible image; and
processing circuitry configured to:
detect an end position of the recording medium and a position of the mark on the recording medium from a read image output from the reader; and
select the visible image or the invisible image as the read image used for position detection, according to an absorption characteristic of a color material forming the mark read by the reader and an absorption characteristic of the recording medium in the invisible wavelength region.

2. The position detection device according to claim 1, wherein the processing circuitry is configured to perform the position detection using the invisible image as the read image when the reader reads a recording medium on which the mark is formed with a color material having a higher absorption characteristic than the recording medium in the invisible wavelength region and having a lower absorption characteristic than the background member in the invisible wavelength region.

3. The position detection device according to claim 1, wherein the processing circuitry is configured to perform the position detection using the visible image as the read image when the reader reads the recording medium on which the mark is not formed with a color material having a higher absorption characteristic than the recording medium in the invisible wavelength region or when the reader reads a recording medium having no lower absorption characteristic than the background member in the invisible wavelength region.

4. The position detection device according to claim 1, wherein the reader is configured to irradiate the recording medium having the mark and the background member with near-infrared light as the light of the invisible wavelength to output a near-infrared image as the invisible image.

5. An image forming apparatus, comprising:
the position detection device according to claim 1, wherein the processing circuitry is configured to correct an image formation position on the recording medium, based on a detection result of the position detection; and
an image forming device configured to form an image on the image formation position having been corrected by the processing circuitry.

6. The image forming apparatus according to claim 5, wherein the image forming device is configured to form at least a part of the mark, with a color material having a lower absorption characteristic in a specific region of the visible wavelength region, onto a recording medium having a higher absorption characteristic in the invisible wavelength region than in the visible wavelength region.

7. The image forming apparatus according to claim 5, wherein the image forming device is configured to form, on the recording medium, at least a part of the mark with both a color material having a higher absorption characteristic in the invisible wavelength region than in the visible wavelength region and another color material having a lower absorption characteristic in a specific region of the visible wavelength region.

8. The image forming apparatus according to claim 5, wherein the image forming device is configured to change the color material forming the mark, according to set information of the recording medium.

9. A position detection method to be executed in a position detection device including a reader disposed opposite a background member having an absorption characteristic in a visible wavelength region than in an invisible wavelength region and configured to irradiate the background member and a recording medium having a mark, at least a part of which is formed with a color material having an absorption characteristic in the invisible wavelength region than in the visible wavelength region, with light of a visible wavelength to output a visible image or with light of an invisible wavelength to output an invisible image, the method comprising:

detecting an end position of the recording medium and a position of the mark on the recording medium, from a read image output from the reader; and selecting the visible image or the invisible image as the read image used in the detecting, according to an absorption characteristic of a color material forming the mark read by the reader in the invisible wavelength region and an absorption characteristic of the recording medium in the invisible wavelength region.

10. A non-transitory storage medium storing computer readable code for controlling a position detection device that includes a reader disposed opposite a background member having an absorption characteristic in a visible wavelength region than in an invisible wavelength region and configured to irradiate the background member and a recording medium having a mark, at least a part of which is formed with a color material having an absorption characteristic in the invisible wavelength region than in the visible wavelength region, with light of a visible wavelength to output a visible image or with light of an invisible wavelength to output an invisible image, the computer readable code for controlling the position detection device to execute:

detecting an end position of the recording medium and a position of the mark on the recording medium, from a read image output from the reader; and selecting the visible image or the invisible image as the read image used in the detecting, according to an absorption characteristic of a color material forming the mark read by the reader in the invisible wavelength region and an absorption characteristic of the recording medium in the invisible wavelength region.

\* \* \* \* \*